Patented June 17, 1947

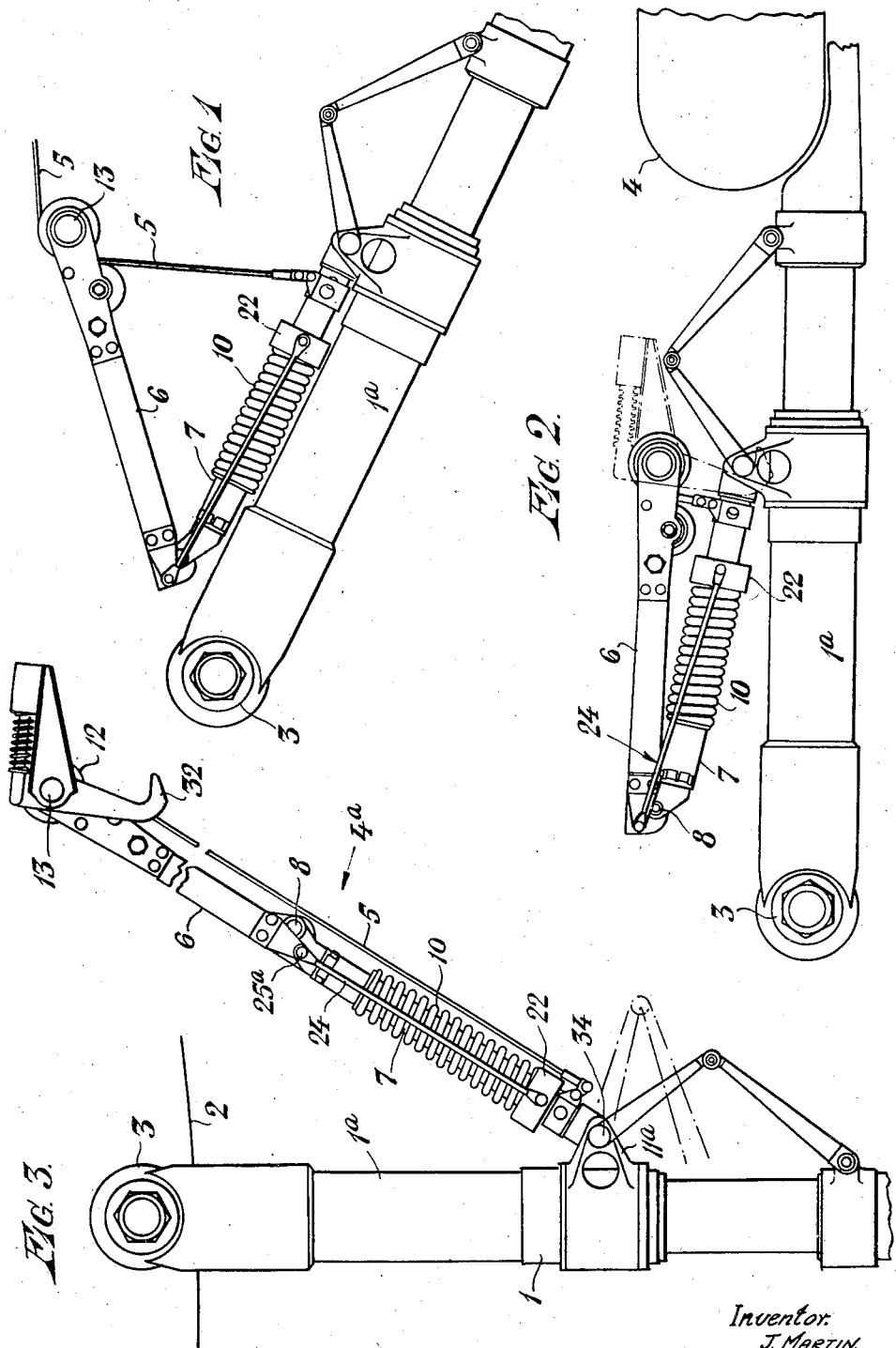

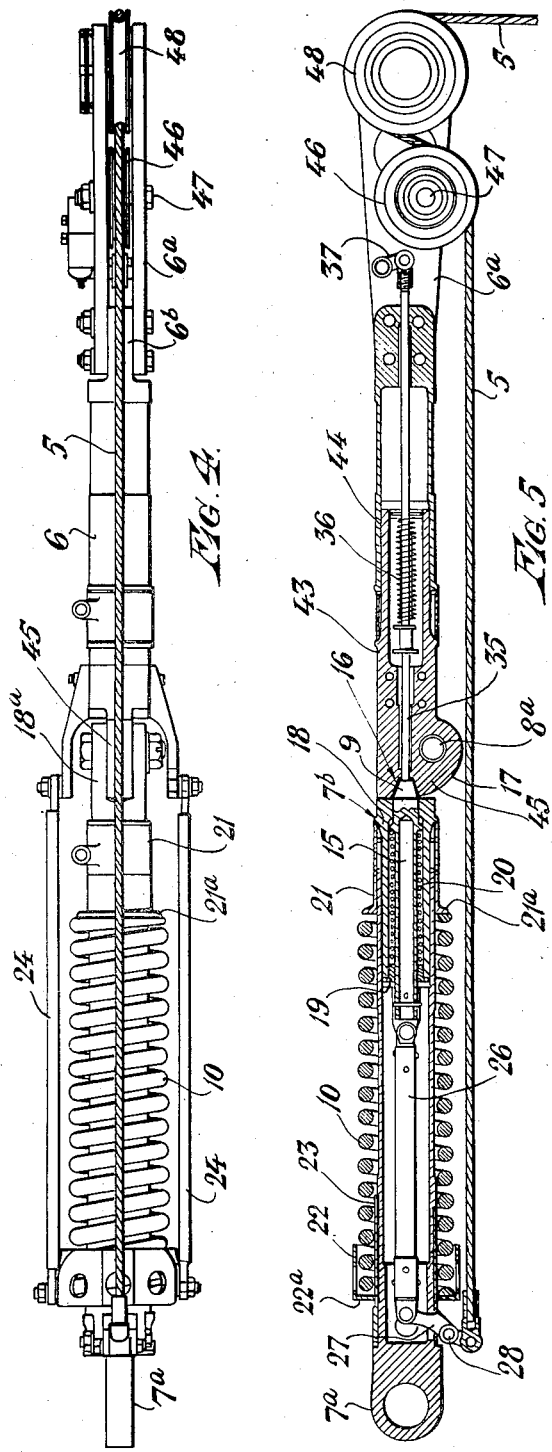
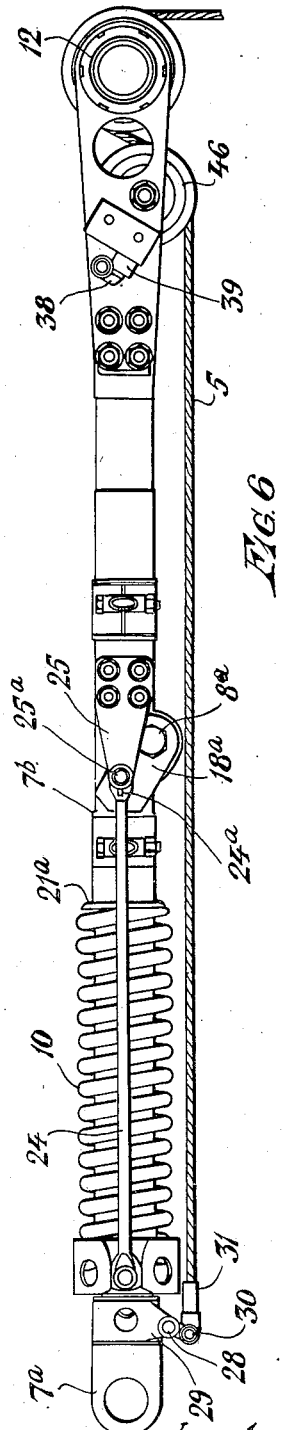

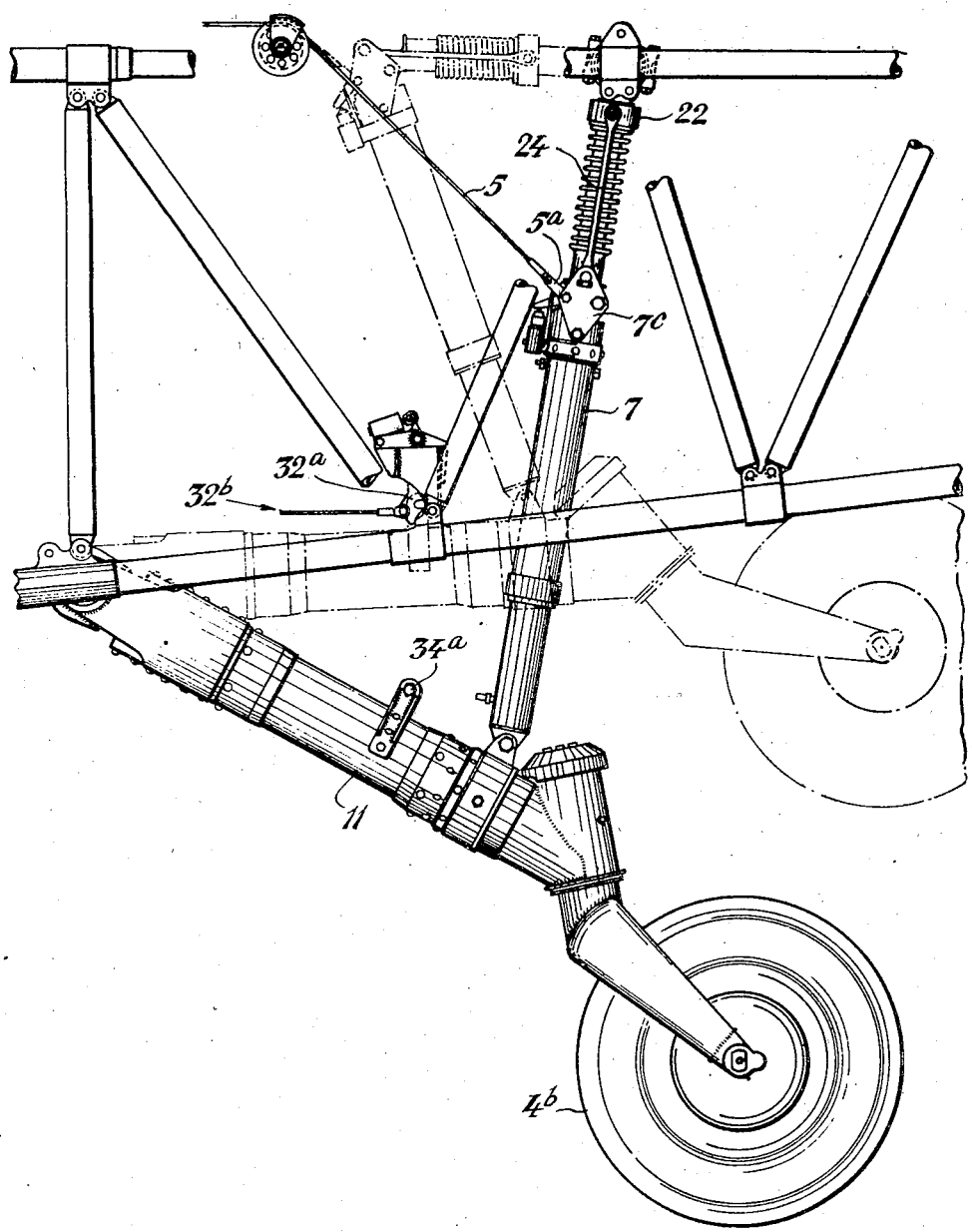

2,422,577

UNITED STATES PATENT OFFICE 2,422,577

RETRACTABLE UNDERCARRIAGE FOR AIRCRAFT

James Martin, Higher Denham, near Uxbridge, England

Application June 25, 1943, Serial No. 492,287
In Great Britain July 15, 1942

4 Claims. (Cl. 244—102)

This invention relates to retractable undercarriages and tail wheels for aircraft and more particularly to the type of undercarriage or tail wheel in which each wheel is attached to the outer portion of a leg, hinged to the aircraft for folding to the retracted position or to be lowered for landing, the leg embodying resilient means to absorb the shock of landing.

The object of this invention is to provide a simple practical and reliable form of retractable undercarriage having positive locking means for retaining the undercarriage in the "down" position when landing and in the retracted position during flight.

According to this invention an aircraft undercarriage comprises in combination an oleo or other shock absorbing wheel carrying member pivoted to the aircraft and adapted to be raised and lowered about the axis of its pivotal connection to the aircraft, and a collapsible radius rod in the form of two arms one of which is pivoted at one end to the leg and the other of which is pivoted at one end to the aircraft, such two arms being hinged together so that they may be folded close together in the retracted position, means automatically locking said arms in substantially co-axial alignment when the leg is fully lowered, and means operable from a remote control device for raising the leg adapted to automatically break the locked connection of the two arms when actuated to raise the leg.

In the preferred form of the present invention an undercarriage for an aircraft is tension cable operated for retracting it and that the operative tension of the cable effects a breaking or unlocking operation of a collapsible strut or radius rod device adapted in the retracted position to be folded between the leg of the undercarriage or shock absorbing wheel carrying section and the aircraft, said collapsible strut or radius rod device including a spring loaded operated catch or lock adapted to lock the strut device automatically in the fully extended position. The two arms of the radius rod are connected by a knuckle joint acted upon by a stout spring so that after an initial downward movement of the undercarriage leg, a dead-centre position is passed and the force of the spring acts to straighten the radius rod and forces the undercarriage positively into the fully lowered position.

In order that this invention may be clearly understood and readily carried into effect drawings are appended hereto illustrating embodiments thereof, and wherein Fig. 1 is a broken front elevation view showing the undercarriage retracted, Fig. 2 is a broken front elevation view showing the undercarriage lowered to an extent in which tie rods hereinafter described form a dead centre position with the axis of a knuckle joint pivotally connecting two arms of the radius rod, Fig. 3 is a broken front elevation view showing the undercarriage fully lowered, Fig. 4 is a view of the extended tie rod taken in the direction of the arrow 4ª of Fig. 3, Fig. 5 is a longitudinal sectional side elevation of Fig. 4, Fig. 6 is an outside side elevation view of Fig. 4, and Fig. 7 is a side elevation view showing the invention adapted to a tail wheel.

Referring to the drawings the cylinder 1ª of oleo leg 1 is pivoted at one end to the appropriate part of the aircraft 2 by a bolt and suitable bearings indicated generally by the reference numeral 3, and the leg carries the wheel 4 at its end remote from its pivot 3 in well known manner.

The leg 1 is adapted to be raised by the tension of a cable 5 connected at one end to suitable winding or driving mechanism inside the aircraft and anchored at its other end to the leg in a manner hereinafter explained through the medium of a collapsible radius rod constituted by two arms 6 and 7 connected together by a knuckle joint 8. The initial retracting or lifting tension on the cable 5 is arranged to disengage a locking catch member 9 (see Fig. 5) as hereinafter described and then to relieve the knuckle joint of the influence of a coiled compression spring 10 which normally functions to force the arms 6 and 7 of the radius rod into co-axial relationship and to maintain them in the fully strutting position. When the knuckle joint is relieved of the influence of the spring 10, the joint may be readily broken to allow the arms to fold and the undercarriage to be raised.

The arm 7 of the radius rod is pivoted at one end by a lug 7ª thereon to a bifurcated lug 11 on the outer end of the cylinder 1ª of the leg, and the relatively remote end of the other arm 6 is fixed to an outer ring of a ball bearing 12 located on a fixed pivot pin 13 in a bracket 14 fixed to the appropriate part of the aeroplane wing or fuselage. These two arms 6 and 7 are both mainly of tubular section and are co-axial when the undercarriage is down. The lower of these two arms of the radius rod, i. e. the arm 7 pivoted to the cylinder of the leg, accommodates at its knuckle joint end a spring loaded locking plunger 15 shaped at one end to form the said catch 9, such catch being adapted to trip into a recess 16 (see Fig. 5) in the free end of the upper arm 6, for which purpose such free end is camshaped as at 17 to enable the catch end 9 of the plunger 15 to slide thereover until it trips into the said recess. This plunger 15 slides concentrically in a tubular housing 18 screwed into the inner end of the tubular arm 7, a plug or annular retaining nut 19 being threaded into the end of such housing inside this arm to form an abutment for one end of a coiled compression spring 20 encircling the plunger and abutting at its other end against an annular stop 15ᵃ on the plunger. This housing 18 is bored axially at its end nearer the knuckle joint to slidably accommodate the exposed or catch end 9 of the plunger 15, such catch end of the plunger being tapered and radiused at its corners as shown in Fig. 5, to engage smoothly in the correspondingly tapered recess 16 of the said camshaped end 17 of the upper arm 6 of the radius rod. The housing 18 is bifurcated at one end as at 18ᵃ to form part of the knuckle joint 6 of the radius rod, the other part being the said camshaped end 17 of the upper arm, a hinge pin 8ᵃ being passed through such lugs and the said end of the upper arm, the axis of this hinge pin being offset in relation to the axis of the extended radius rod.

A sleeve 21 loose on the inner end of the lower arm 7 of the radius rod abuts against a flange 7ᵇ thereon, the other end of this sleeve being flanged as at 21ᵃ to form an abutment for the inner end of a stout coiled compression spring comprising the beforesaid spring 10 encircling the lower arm 7 and which positively forces the two arms of the radius rod into the fully extended position or co-axial relationship. The other end of this spring abuts against a flange 22ᵃ on a thrust collar 22 cupped to encircle this end of the spring and carried by a sleeve 23 having freedom for limited sliding movement upon the said lower arm. The thrust collar is connected by a pair of slotted tie rods 24 to a pair of fork ends 25 on the upper arm 6 which project beyond the pivot (hinge pin 8ᵃ) of the offset knuckle joint. The slots in the tie rods 24 are indicated by the reference numeral 24ᵃ and they receive studs 25ᵃ of the fork ends 25. The spring 10 thus exerts a strong influence on the knuckle joint to ensure the completion of movement of the two arms into the fully extended co-axial position. In order to break the knuckle joint of the radius rod when it is desired to retract the undercarriage the locking plunger 15 with its catch 9 has to be retracted and this spring 10 slightly compressed so that the slotted tie rods 24 no longer transmit its force to the fork ends 25 of the upper arm 6 of the radius rod and the knuckle joint is relieved of the influence of the spring.

This latter dual operation is effected by the initial pull on the operating cable 5 and for this purpose the locking plunger 15 is connected inside the arm 7 by a push rod 26 to one end of a small lever 27 pivoted by a bolt 28 to and between a pair of lugs 29 formed on the said sleeve 23 carrying the said thrust collar. The outer end of this lever has pinned to it by a pivot bolt 30 one end of a bush or thimble 31 in which is fixed the appropriate end of the said cable 5 so that the initial operative pull of the cable 5 turns the lever 27 of the locking plunger push rod 26 slightly on a fulcrum afforded by its pivotal connection to the sleeve 23 thus withdrawing the catch end of the locking plunger 15 and unlocking the knuckle joint. When the inner end of the small lever 27 abuts against the closed end of the arm 7 as shown in broken lines in Fig. 5, then the small lever turns about this closed end as a fulcrum and further pull on the cable will move the thrust collar 22ᵃ to compress the spring 10 on the lower arm 7. Owing to the lost motion in the slotted connection of the tie rods 24 to the arm 6 the force exerted by the spring is no longer communicated to the fork ends 25 of the upper arm of the radius rod and the knuckle joint is easily broken. Further pull on the cable 5 folds up the two arms 6 and 7 of the radius rod and raises the leg of the undercarriage.

The axis of the pivot bolt 8ᵃ of the knuckle joint 6 of the two arms 6 and 7 of the radius rod is, as beforesaid, uni-lateral in relation to the axis of the extended radius rod and is slightly above the common axis of the two studs 25ᵃ engaged in the said slots 24ᵃ of the tie rods, the relative positions of these axes being such that when the leg has dropped about 25° the two tie rods are in a dead-centre position in relation to such axes as shown in Fig. 2. As soon as the dead-centre position is passed, the force exerted by the compression spring 10, through the tie rods 24, acts to turn the two arms 6 and 7 of the radius rod about the knuckle joint pivot bolt 8ᵃ until the knuckle joint snaps forcibly into the straight position and is locked by the locking catch 9. In this position the leg is fully down and is locked and braced by the radius rod.

A bifurcated pawl type of catch 32 engages automatically by the action of a spring 33 over a pair of radial pins 34 on the free end of the leg cylinder when the leg reaches its fully raised position. Remote control operated means (not shown) is provided to actuate such catch against the influence of its spring means to release the leg so that the leg and wheel will fall by gravity about the hinge of the leg when the undercarriage is to be lowered.

The beforesaid locking plunger can operate the means for indicating to the pilot that the leg is fully down, for which purpose the upper arm 6 of the two arms of the radius rod can accommodate an axially slidable plunger 35 loaded in the opposite direction to the locking plunger 15 by a weak spring 36, one end of this indicator operating plunger extending into the recess 16 in the outer end of such inner arm 6 into which the locking plunger catch end 9 trips so that the locking plunger presses the indicator operating plunger 35 upwards inside the radius rod as the locking action takes place. The other end of this indicator operating plunger passes through the top of the tubular part of the said inner arm and is connected with a small crank 37 pivoted between a forked inner end 6ᵃ of this arm 6, the pin of this crank carrying outside such forked end an arm 38 carrying a contact adapted to bridge contacts of a circuit closing device 39 connected to an electrically operated indicator on the instrument panel of the aircraft.

Similarly to the arm 7, the upper arm 6 can be formed in two sections by making the knuckle joint end of the arm 6 from a strong metal sleeve 43 threaded as at 44 into the tubular body part of the arm 6, the outer end of this sleeve being shaped to form a lug 45 to fit between the furcations 18ᵃ of the arm 7, such lug having the cam edge 17 formed thereon. The furcations 6a at the anchored or top end of the arm 6 can, as shown, comprise two plates bolted to a centre lug 6b of the arm 6, and between these furcations is located a pulley 46 rotating on a bolt 47, the cable 5 negotiating this pulley and another pulley 48 fitted about the bearing member 12 of the pivot of the radius rod.

The pulley 46 is so located that the tensioned cable 5 extends alongside the radius rod clear of the knuckle joint.

When the invention is applied to a tail wheel 4b e. g. as shown in Fig. 7 the arm 7 can include the shock absorbing means, the leg 11 occupying an inclined fully lowered position as shown in full lines and instead of having a knuckle joint connection between the arms 6 and 7 which is offset in relation to the common axis of the arms of the radius rod when in the strutted position, the requisite hinge connection of the two arms can be across such axis by pivoting the lower end of the arm 6 between two diamond shaped side plates or lugs 7c bolted to the top of the arm 7, and the tie rods 24 can be pivoted to the upper corners of these lugs 7c and the slidable thrust collar 22 which in this embodiment is mounted with the spring 10 about the arm 6. The cable 5 can be anchored by links 5a to a part of the hinged joint of the two arms.

The position of the retracted tail wheel and its associated parts is indicated by the broken lines. It will be seen that when the tail wheel is raised that the spring 10 is under maximum compression and that its load is applied by the links 22 to the arm 7 in such manner as to assist in the lowering of the tail wheel.

A catch 32a engages a bolt 34a fixed across a pair of lugs 34b in the leg 11 to retain the leg in the raised position, such catch being operated to free the leg by the pull on a cable 32b connected to a suitable remote control device.

In referring to the wheel carrying member 1 as a leg it will be understood that it may be of single axis tubular form as shown, a parallel pair of legs or a frame unit adapted to support one or a pair of wheels.

I claim:

1. In an aircraft retractable undercarriage, the combination of, a leg having a wheel rotatably mounted on one end and having the other end adapted to be pivotly mounted on an aircraft, means for extending said leg comprising a straight foldable strut having one end attached to said leg and the other end adapted to be attached to the aircraft, said strut comprising two arms connected by means of a joint the pivotal axis of which is offset from the longitudinal axis of said strut, a coil spring surrounding one of the arms of said strut and adapted and arranged to urge said arms into co-axial alignment and a spring actuated means mounted on one of the arms of said strut to lock said arms in co-axial alignment, and remote controlled means for folding said strut.

2. In an aircraft retractable undercarriage, the combination of, a leg having a wheel rotatably mounted on one end and having the other end adapted to be pivotally mounted on an aircraft, a straight foldable strut having one end attached to said leg and the other end attached to the aircraft, said strut comprising two arms connected by means of a joint the pivotal axis of which is offset from the longitudinal axis of said strut, a coiled compression spring surrounding one of said arms, said other arm having a forked end the prongs of which extend beyond said joint, a sliding abutment on one end of said spring, a pair of tie rods positioned parallel to said arm and pivoted at one end to said sliding abutment, and pivoted at the other end to the prongs of said other arm at point between said joint and said abutment whereby said spring urges said arms into co-axial alignment, and remote controlled means for folding said strut.

3. In an aircraft retractable undercarriage as recited in claim 2, in which the remote control means for folding said strut comprises a cable and means attached to one end of said cable to cause a compression of said coil spring when tension is applied to said cable preparatory to folding said strut.

4. In an aircraft retractable undercarriage as recited in claim 2, in which the remote control means for folding said strut comprises a cable, a lever attached to one end of said cable, said lever arranged and positioned to engage said sliding abutment when tension is applied to said cable whereby said spring is compressed prior to the folding of said strut.

JAMES MARTIN.

REFERENCES CITED

The following references are of record in the file of this patent:

UNITED STATES PATENTS

| Number | Name | Date |
| --- | --- | --- |
| 1,329,533 | McCarroll | Feb. 3, 1920 |
| 2,277,896 | Albright | Mar. 31, 1942 |
| 2,288,968 | Dowty | July 7, 1942 |
| 2,224,481 | Laraque | Dec. 10, 1940 |

FOREIGN PATENTS

| Number | Country | Date |
| --- | --- | --- |
| 473,202 | Great Britain | Oct. 8, 1937 |
| 518,130 | Great Britain | Feb. 19, 1940 |
| 458,187 | Great Britain | Dec. 15, 1936 |
| 464,144 | Great Britain | Apr. 13, 1937 |